United States Patent [19]
Rappenecker et al.

[11] Patent Number: 5,590,235
[45] Date of Patent: Dec. 31, 1996

[54] DC MOTOR CONTROL WITH PERIODIC RESET

[75] Inventors: Hermann Rappenecker, Vöhrenbach; Frank Jeske, Tennenbron, both of Germany

[73] Assignee: Papst-Motoren GmbH & Co. KG, Georgen, Germany

[21] Appl. No.: 343,723

[22] Filed: Nov. 22, 1994

[30] Foreign Application Priority Data

Dec. 3, 1993 [DE] Germany ............. 43 41 203.3

[51] Int. Cl.$^6$ ................................................. H02P 7/28
[52] U.S. Cl. ...................................... 388/803; 388/812
[58] Field of Search ........................... 318/430–490, 318/685, 696, 786, 778, 254, 481, 138, 603, 113, 49, 53; 364/474.07, 431.11, 280.3; 395/834, 182.13, 182.09; 388/831, 814, 812, 828, 803, 822, 809, 906, 816

[56] References Cited

U.S. PATENT DOCUMENTS

| | | | |
|---|---|---|---|
| Re. 33,379 | 10/1990 | Bradus | 388/802 |
| 3,873,897 | 3/1975 | Müller . | |
| 4,491,772 | 1/1985 | Bitting | 318/254 |
| 4,494,055 | 1/1985 | Bitting | 318/254 |
| 4,499,408 | 2/1985 | Bitting | 318/254 |
| 4,500,821 | 2/1985 | Bitting | 318/254 |
| 4,512,019 | 4/1985 | Bodig et al. | 364/431.11 |
| 4,550,277 | 10/1985 | Carney | 318/434 |
| 4,628,233 | 12/1986 | Bradus | 318/434 |
| 4,719,577 | 1/1988 | Eley | 364/474 |
| 4,748,386 | 5/1988 | Nakanishi | 318/254 |
| 4,806,833 | 2/1989 | Young | 318/335 |
| 4,825,133 | 4/1989 | Tanuma et al. | 318/696 |
| 4,899,093 | 2/1990 | Gleim | 318/254 |
| 4,918,365 | 4/1990 | Tanuma et al. | 318/685 |
| 4,928,043 | 5/1990 | Plunkett | 318/254 |
| 5,087,865 | 2/1992 | Nelson III | 318/139 |
| 5,204,593 | 4/1993 | Ueki | 318/254 |
| 5,335,307 | 8/1994 | Sommer | 388/814 |
| 5,360,077 | 11/1994 | Nishimoto et al. | 180/79.1 |
| 5,367,665 | 11/1994 | Koch et al. | 395/575 |

FOREIGN PATENT DOCUMENTS

| | | |
|---|---|---|
| 0259764A1 | 3/1988 | European Pat. Off. . |
| WO89-009957A1 | 10/1989 | European Pat. Off. . |
| 0566297A1 | 10/1993 | European Pat. Off. . |
| 2842392 | 4/1980 | Germany . |
| 3214006 | 10/1983 | Germany . |
| 3322242 | 1/1984 | Germany . |
| 3420560A1 | 12/1984 | Germany . |
| 3412235A1 | 10/1985 | Germany . |
| 3603659 | 7/1987 | Germany . |
| 3630312 | 3/1988 | Germany . |
| 4002158 | 8/1991 | Germany . |
| 4040847 | 7/1992 | Germany . |

OTHER PUBLICATIONS

Iizuka et al., "Microcomputer Control for Sensorless Brushless Motor," IEEE Transactions on Industry Applications, vol. IA–21, No. 4, May/Jun. 1985.

Eugene Zumchak, *Microcomputer Troubleshooting & Design*, pp. 164–179 and 326–329 (Howard Sams, Indianapolis (1982).

Klaus Bender et al., *Mikrorechner Struktur und Programmierung* [Microcomputer Structure & Programming], pp. 46–47, VDI–Verlag, Düsseldorf, Germany.

R. Müller (R+D Director, Papst–Motoren), "Zweipulsige kollektorlose Gleichstrommotoren" [Two–pulse collectorless DC motors] in *ASR–Digest für angewandte Antreibstehnik*, 1977.

*Primary Examiner*—Paul Ip
*Attorney, Agent, or Firm*—Milton Oliver

[57] ABSTRACT

An electric motor (10) particularly a low-voltage collectorless dc motor, has a microprocessor (18, 40) with a reset input (24). Further, it has a device (26) which, during the running of the motor, generates signals (R) which depend upon the rotational position of the rotor (14) of the motor (30). These signals are applied to the reset input (24) and have the effect that the microprocessor is reset to predefined starting states or conditions, at times controlled by the turning of the rotor (14).

16 Claims, 6 Drawing Sheets

L = Low =
H = High =

DC MOTOR CONTROL WITH PERIODIC RESET

CROSS-REFERENCE TO RELATED PATENT DOCUMENTS, THE DISCLOSURES OF WHICH ARE INCORPORATED BY REFERENCE

U.S. Pat. No. 3,873,897, Müller/Papst-Motoren, and German DE 23 46 380; U.S. Ser. No. 08/305,145, Karwath/Papst-Motoren, filed Sep. 13, 1994 now U.S. Pat. No. 5,537,075; U.S. Ser. No. 08/341,380, Jeske, Karwath & Rappenecker, filed Nov. 17, 1994, and corresponding German DE 43 40 248, filed Nov. 28, 1993.

FIELD OF THE INVENTION

The present invention relates generally to electric motors and, more particularly, to an improved method of operating a microprocessor-controlled motor which utilizes the RESET input of the microprocessor.

BACKGROUND

Microprocessor-controlled motor systems are vulnerable to electrical noise on the input leads to the microprocessor, which noise can sometimes make the microprocessor "hang" and thereby bring the motor itself to a standstill. This can occur, for example, through bursts of transient impulses or Electro-Static Discharge ("ESD"), i.e., noise signals which may arise in environments filled with strong electrical activity.

One generally tries to alleviate this situation by providing protective circuitry at the inputs of such a microprocessor, but this is costly and doesn't always achieve the desired result.

SUMMARY OF THE INVENTION

Accordingly, it is a primary object of the present invention to provide a new microprocessor-controlled motor system, and a method of operating it which prevents microprocessor hang-ups.

Briefly, this is achieved by using rotor position signals to periodically trigger reset of the microprocessor or similar control circuit to a predefined starting state. The use of signals generated by the motor itself during its rotation offers both simplicity and high reliability, since it is largely independent of, or immune to, any electrical disturbances and accomplishes a defined reset, preferably at least once each rotation cycle. Thus, even if noise does cause a microprocessor "hang", this is resolved a split-second later by resetting the microprocessor (or other digital control circuit) to defined initial or starting conditions, allowing it to again work normally.

The invention is especially well adapted for use with collectorless DC motors which are digitally commutated or controlled.

Further details and advantageous refinement of the invention will be apparent from the following description and accompanying drawings. These describe preferred embodiments, but are not intended to limit the scope of the invention to the particular structures shown and described.

BRIEF FIGURE DESCRIPTION

Figure 4:
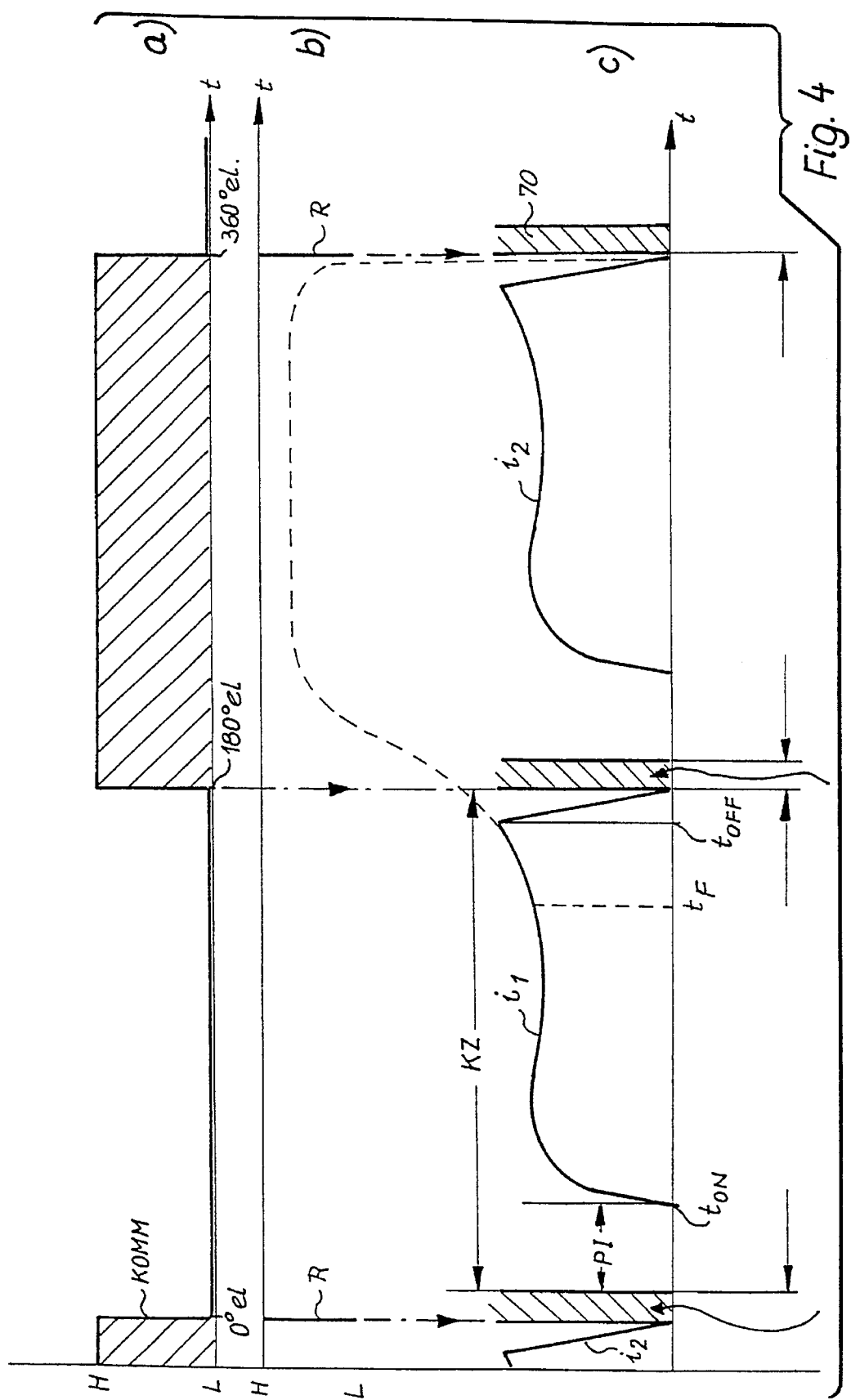
FIG. 4 is a group of signal graphs, drawn to a common time scale, showing what happens during rotation of the rotor through 360° (electrical)
Figure 7:
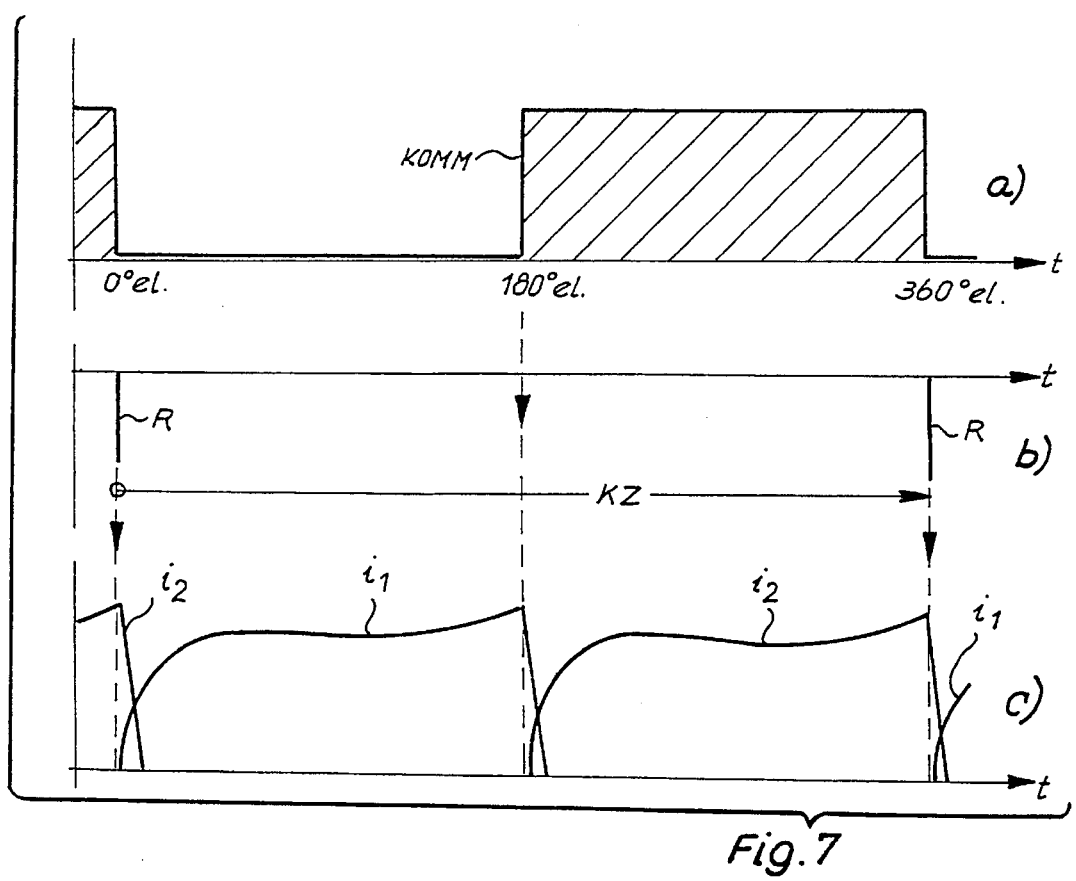
Figure 8:
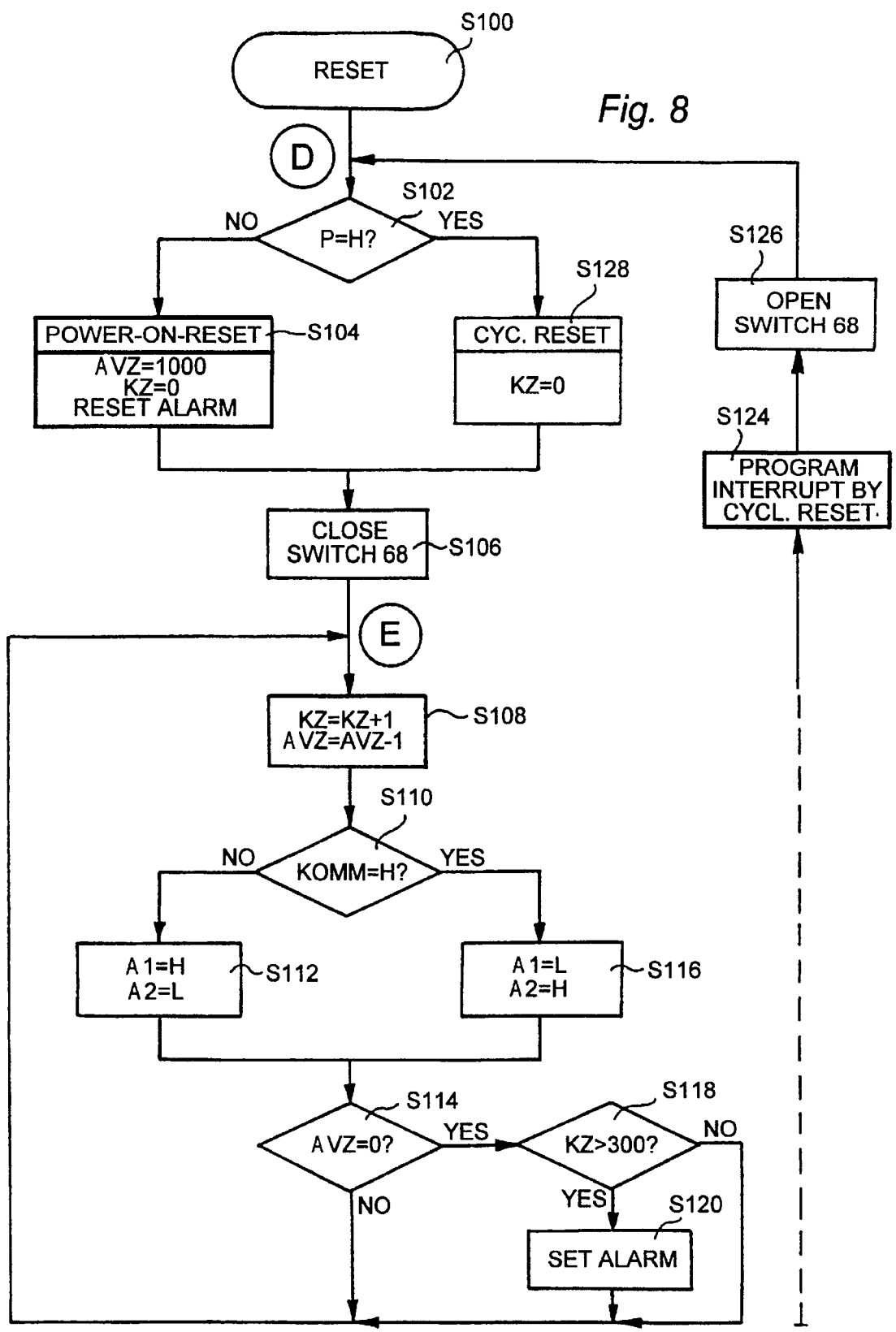

FIG. 7 is a group of signal graphs analogous to FIG. 4, showing what happens in the motor during rotation of the rotor through 360° (el) when it is operated according the flowchart of FIG. 8; and FIG. 8 is a flowchart of a control program to cause the motor behavior shown in FIG. 7, which program also continuously monitors to assure a predetermined minimum RPM; during start-up of the motor, this RPM monitoring is momentarily disabled.

DETAILED DESCRIPTION

Figure 1:
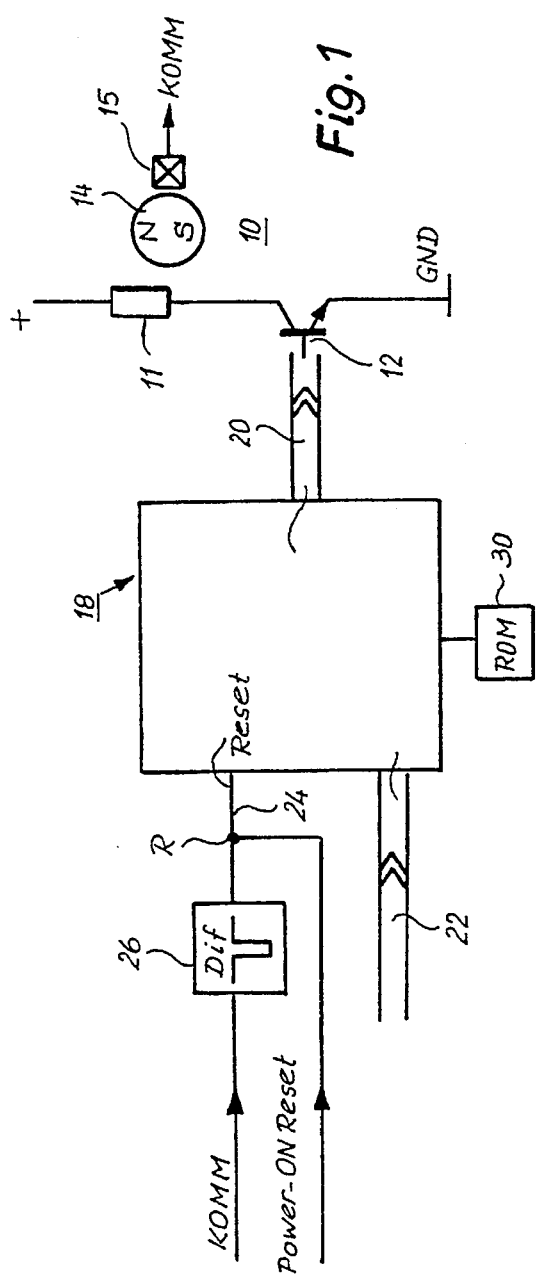
FIG. 1 is a schematic diagram illustrating the basic principle of the motor system of the present invention.

FIG. 1 is a schematic diagram illustrating the basic principle of the invention. To the right, one sees the basic elements of an electric motor 10, namely a stator winding 11, whose current supply is controlled by a transistor 12, the motor's rotor 14, and a rotation position sensor 15 which generates a commutation signal KOMM. Sensor 15 is typically a Hall generator which detects the magnetic field of rotor 14. However, the present invention can be used in similar fashion in a so-called "sensorless" motor in which the rotor position is repeatedly calculated from other motor data. The KOMM signal can, for example, have the form shown in FIG. 2a. A reset signal R can be generated in any kind of electric motor using a suitable sensor actuated by rotation of the motor's rotor. Suitable sensors are also known for use in linear motors.

Transistor 12 is controlled by a microprocessor 18, by connection to its control output(s) 20. To the control inputs 22 of microprocessor 18 are fed corresponding signals, e.g. about the RPM at which one wishes electric motor 10 to rotate. Further, microprocessor 18 has a RESET input 24, to which the reset signal R can be fed, in order to reset the microprocessor to defined starting conditions. Internal information of microprocessor 18, prepared before reset signal R, can be retained, and processed further after the reset. However, those states which could have been disturbed by noise on the input lines, e.g. overflow of an internal counter, are reset. For example, the instruction counter can be put back to a predetermined state and started anew.

Figure 2:
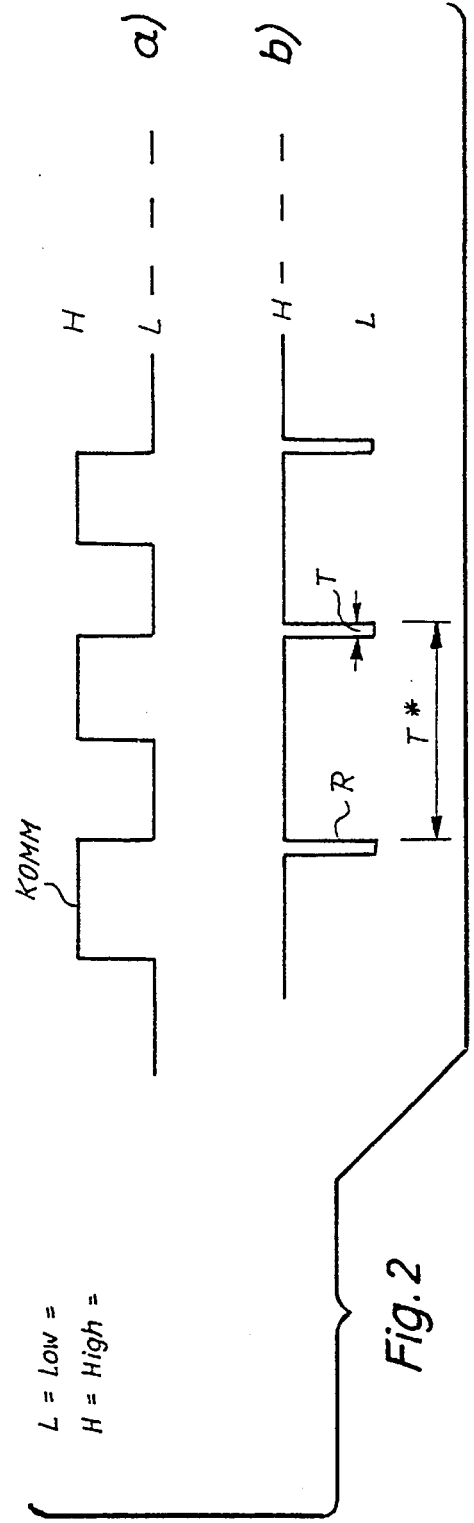
FIG. 2 is a pair of signal graphs, drawn to a common time scale, which show how the circuit of FIG. 1 operates.

As shown in FIG. 1, signal KOMM is fed to a differentiating element 26 which, as shown in FIG. 2, uses differentiation to detect the falling edge of the KOMM signal and transform it into a reset signal R of short, predefined duration T. As shown in graph 2b, the reset signal R is generated cyclically at intervals of T* which represent, for example, half a rotor rotation for a 4-pole rotor 14 or a full rotor rotation for a 2-pole rotor 14 (shown); thus the intervals are preferably 360° (electrical).

If, prior to the reset, a malfunction occurred, after the reset the process is back "in step", that is, as long as rotor 14 rotates and the reset signals R are generated, a control process is iteratively restarted from scratch, so that errors or malfunctions are eliminated, by transient steps, from the control process.

In the same manner, as shown in FIG. 1, one can perform a Power-ON Reset, i.e. a complete initialization of microprocessor 18 like that done upon initial power-up of motor 10. The preferred method for doing this is explained below, with reference to FIGS. 3–5.

Figure 3:
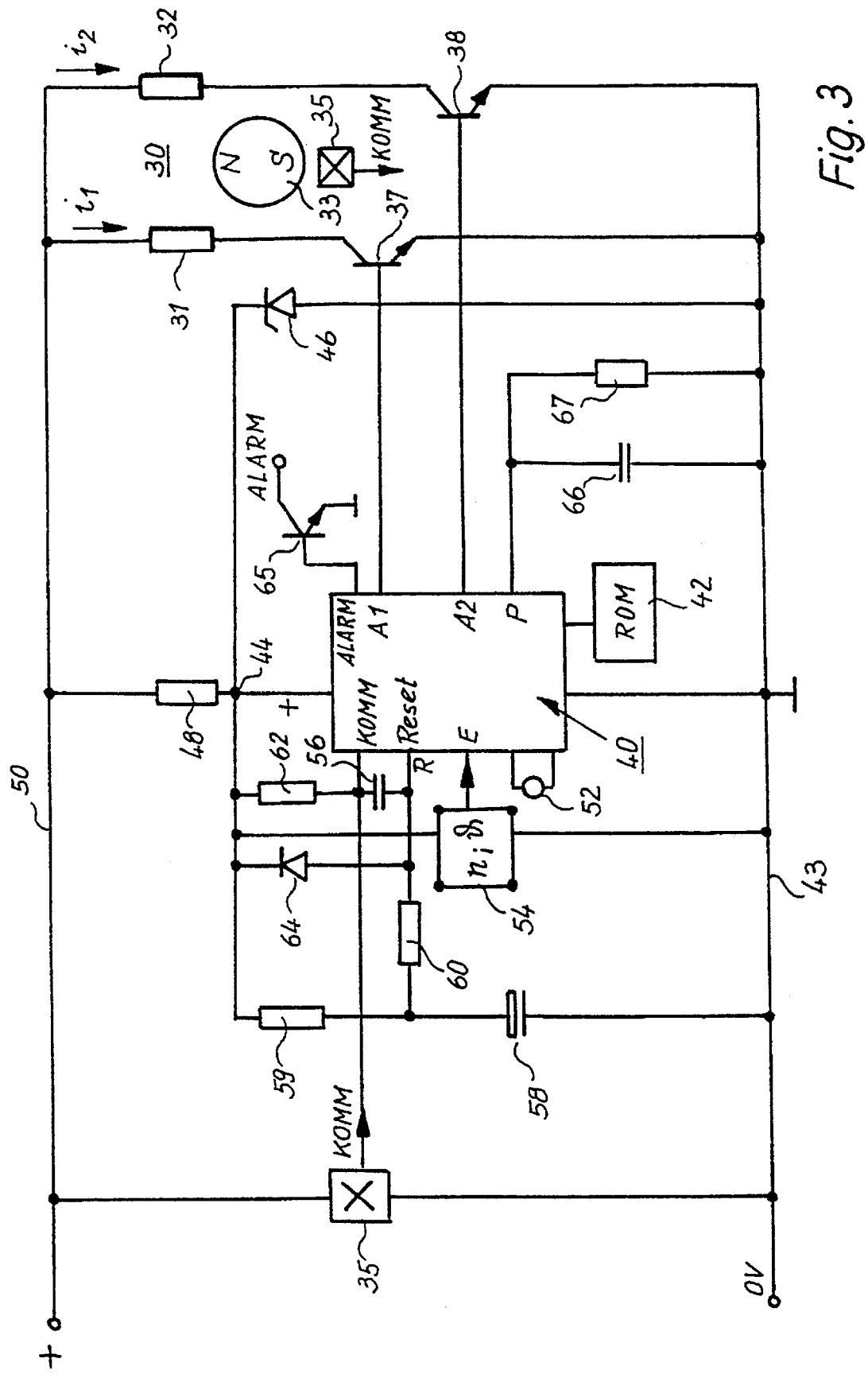
FIG. 3 is a diagram of a system including a collectorless DC motor which is controlled by a microprocessor or has its RPM regulated.

FIG. 3 illustrates a preferred embodiment of the use of the invention with a two-stranded, two-pulse collectorless DC motor 30 of the kind known from U.S. Pat. No. 3,873,897, Müller/Papst-Motoren, and German DE 23 46 380 C2. Details and components are described therein. This motor is, of course, only an example and the invention is suitable for use with all kinds of motors, drive mechanisms or process control systems, but has particular advantages in combination with collectorless DC motors and especially with 2-pulse collectorless motors. For definitions of the foregoing terms, see article by Rolf Müller in *ASR Digest für angewandte Antreibstechnik,* pages 27–31, 1977.

The electric motor 30 has two stator winding strands 31, 32 and a permanent magnet rotor 33, in whose vicinity a rotor position sensor 35 is arranged. Sensor 35 generates the signal KOMM shown in FIG. 2, graph a. Sensor 35 can be a Hall IC.

Control of respective currents $i_1$ and $i_2$ in windings 31 and 32 is handled by two NPN transistors 37, 38 whose bases are connected to respective outputs A1 and A2 of microprocessor 40. A Read Only Memory (ROM) 42 is connected to microprocessor 40 to hold its control program.

Figure 5:
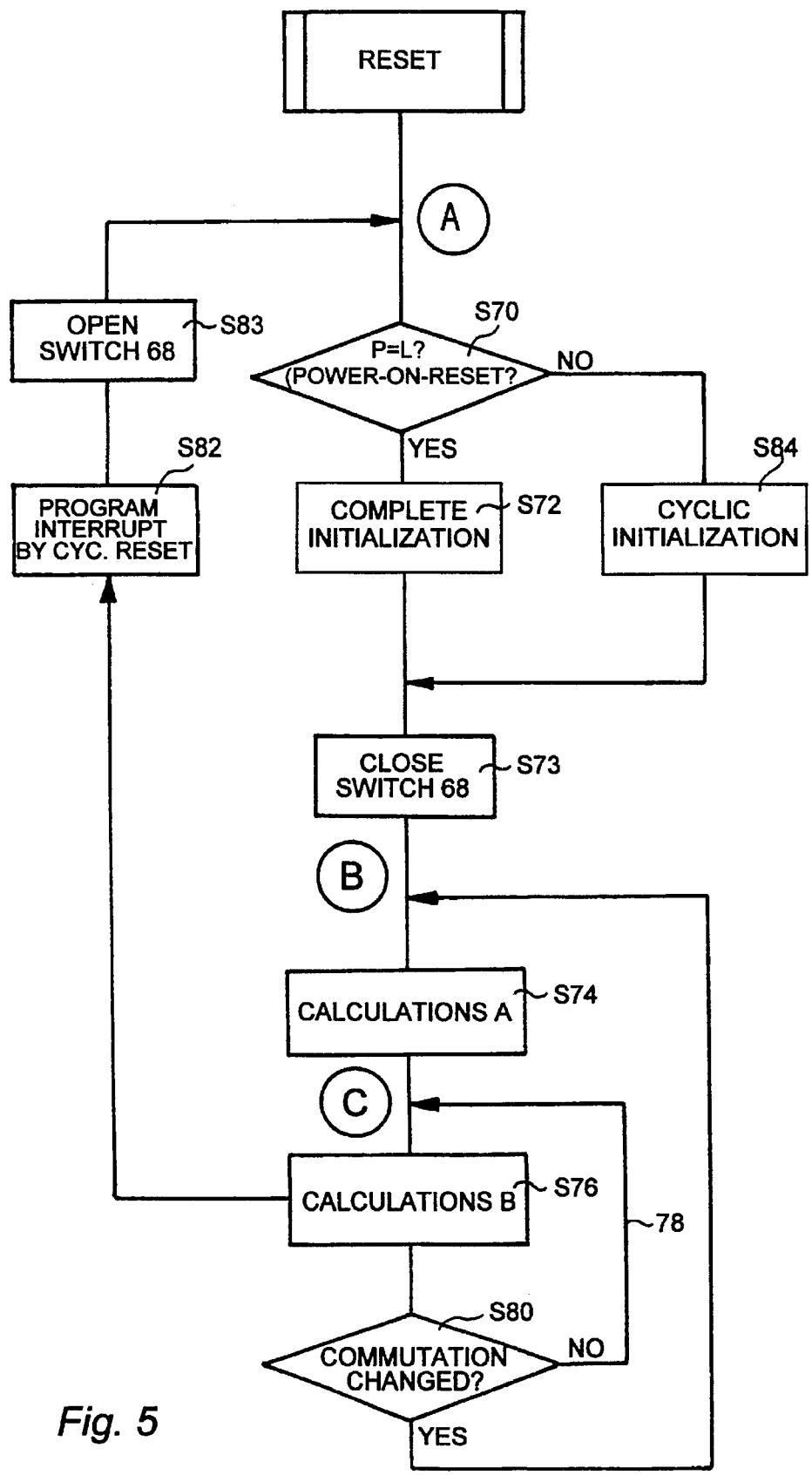
FIG. 5 is a flowchart of the arrangement of FIG. 4.

The signals at the outputs A1 and A2 alternately turn on transistors 37 and 38, that is, whenever transistor 37 is switched ON and winding 31 is carrying current, transistor 38 is switched OFF and winding 32 is current-less. Conversely, whenever transistor 38 is switched ON, so that winding 32 carries current, transistor 37 is switched OFF, so winding 31 is current-less. This is shown in FIG. 5 and thoroughly described in U.S. Pat. No. 3,873,897, Müller/Papst-Motoren, and German DE 23 46 380 C2. For purposes of regulating RPM and the like, it is also possible for transistors 37 and 38 to both be OFF at specific times.

"Commutation" is the designation given to the process in which transistor 37 is switched OFF and transistor 38 switched ON, or vice versa. The "commutation instants" or "points" are indicated in FIG. 4 with legends 0° el., 180° el., 360° el., etc. Usually, in this special motor structure, both transistors 37 and 38 are momentarily blocked during the commutation. However, if desired, current overlap could occur, i.e., both transistors 37 and 38 could be conductive simultaneously.

The commutation is controlled by the KOMM signal of sensor 35. Within the scope of the invention, this signal can have the additional function of cyclically (periodically) resetting microprocessor 40, as described hereinafter.

As shown in FIG. 3, microprocessor 40 is connected to a negative conductor 43 and to a point or junction 44 with a positive voltage of, e.g. +6 V, stabilized by a Zener diode 46. Junction 44 is connected through a resistor 48 to a positive power bus 50.

A clock signal generator 52 (quartz) is, as shown, connected to microprocessor 40 and determines its clock frequency, e.g. 6 MegaHertz (MHz). During operation, microprocessor is fed various input data, and the corresponding inputs are collectively designated as E since they could be any of several different signals, depending upon the application, within the scope of the invention. These signals comes from at least one signal transducer 54, which provides data about, for example, a rotation speed n or a temperature theta to be regulated.

The KOMM signal from sensor 35 is fed to a KOMM input of microprocessor 40. This input, as previously described, carries out the commutation at rotation time points 0° el., 180° el., 360° el. etc.

Microprocessor 40 also has a Reset input, which is connected through a capacitor 56 to the output of sensor 35. Capacitor 56 performs a differentiation of the KOMM signal so that whenever the motor turns, the reset pulses R shown in FIG. 2 arise at the Reset input. Thus, upon each occurrence of an edge of the KOMM going from High (H) to Low (L), capacitor 56 pulls Reset input to L briefly, e.g. for 20 microseconds.

Further, a larger capacitor 58, e.g. 2.2 µf, is provided, which has one terminal connected to negative bus 43 and the other terminal connected through a resistor 59 to junction 44 and through a resistor 60 to the Reset input.

A resistor 62 is provided between the KOMM input and junction 44 whenever sensor 35 is a Hall IC (Integrated Circuit). It is a so-called "pull-up resistor" for the IC. A diode 64 has its anode connected to the Reset input and its cathode connected to junction 44. Whenever the KOMM goes from L to H, this causes, via capacitor 56, a corresponding rise of the potential at the Reset input, and this rise is capped by diode 64. This diode also facilitates a quicker resetting of microprocessor 40 upon interruption of operating voltage.

After power-up of the motor, i.e. the application of an operating voltage between positive and negative conductors 50 and 43, capacitor 58 slowly charges up via both resistors 48 and 59. Since capacitor 58 is initially discharged, there results, during a predetermined time span, e.g. 100 milliseconds, after power-up, a LOW signal at the Reset input, which assures a Power-On Reset. This can readily be distinguished, by its longer duration, from the periodic reset because the latter has a duration of, for example, only about 20 microseconds. Upon Power-On Reset, there is a complete initialization of the motor system, including an inquiry at input E as to the rotation speed n to be controlled, etc., as described at step 130 of the co-pending JESKE et al. application mentioned at the beginning of this specification.

After charge-up of capacitor 58, the signal at the Reset input goes to H (High), which concludes the Power-On Reset. Now execution of the main program, e.g. control of transistors 37, 38 or specific control functions, can begin.

As previously described, upon each H-to-L transition of the KOMM signal, capacitor 56 pulls the voltage at the Reset input to L briefly, which effects a quick cyclical Reset. Due to the higher capacitance of capacitor 58, after the end of the aforementioned edge or transition, the voltage on the Reset input springs back to H. Resistor 60 decouples capacitors 56 and 58 from each other. When the Reset input is back at H, the program execution in microprocessor 40 goes on.

Microprocessor 40 also has an alarm output ALARM, to which is connected an NPN transistor 65, which in turn can connect to a bell or the like (not shown). The flag or signal ALARM is set whenever the RPM of motor 30, during operation, falls below a predetermined value, e.g. due to motor damage. Upon power-up of the motor, this signal is reset or erased.

Further, microprocessor 40 has a port P. Between port P and negative conductor 43, a capacitor 66 is connected. There is also a resistor 67 connected between port P and conductor 43, in parallel to capacitor 66, which serves as a dynamic memory element.

Figure 6:
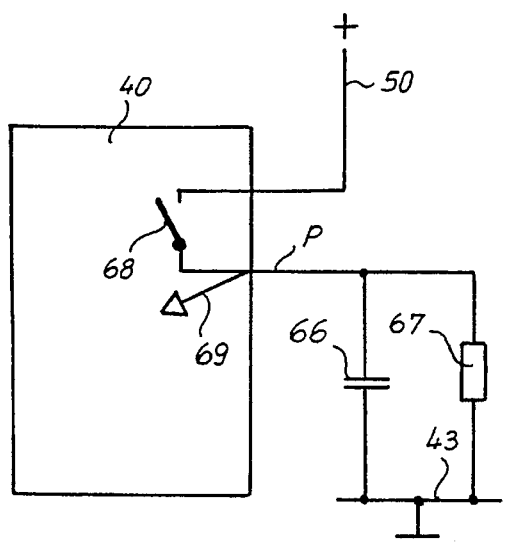
FIG. 6 is an elaboration of port P shown in FIG. 3.

FIG. 6 shows details of port P. Inside microprocessor 40, a switch (transistor) 68 is provided, which can be opened or closed by commands. If switch 68 is closed, a charging current flows through it from positive bus 50 to capacitor 66 and charges the capacitor. If switch 68 is opened, capacitor 66 begins discharging itself, through resistor 67, to bus 43.

If motor 30 is switched off, capacitor 66 is discharged, so that, upon switch-on of the motor, a poll or test of port P (via a connection 69 to the internal logic of processor 40) returns the value P=L. This causes the motor controller to carry out a Power-On Reset.

After switch-on of motor 30, switch 68 is periodically closed, so that capacitor 66 keeps getting newly charged. If, during a Reset process, switch 68 is briefly opened and port P is polled, the value returned is P=H, since capacitor 66 is then in a charged state and cannot discharge much via resistor 67 within a short time span such as 0.1 millisecond. The poll or test value P=H then triggers a cyclical reset, and subsequently switch 68 is closed, so that the charge on capacitor 66 is constantly refreshed.

As long as motor 30 runs, capacitor 66 remains charged, P=H remains true, and it can easily be distinguished, by the logic of microprocessor 40, whether a Power-On Reset or a cyclical reset must be executed.

FIG. 4 shows a preferred course of events during rotation of rotor 33 through 360° el., which in a 2-pole rotor corresponds to one complete turn or rotation. Graph a illustrates the KOMM output signal of sensor 35, which signal controls the commutation and, in the preferred embodiment, also provides a reset signal R (FIG. 4, graph b) once each 360° el. Graph c shows the currents $i_1$ and $i_2$ in motor winding strands 31 and 32. When motor 30 is operating within its intended operating RPM range, there may be substantial gaps or time intervals between these current pulses. If one wishes to have the motor run faster, one must make these gaps smaller (briefer), i.e. make the value PI (shown in graph c) smaller. If one wishes to have the motor run slower, one must make these gaps larger, i.e. make the value PI larger.

The value PI and possibly other values for motor operation, are calculated during a calculation phase A which occurs directly subsequent to the commutation instant. In the exemplary embodiment of a 2-stranded, 2-pulse motor structure, this calculation phase A falls in an interval in which neither of strands 31, 32 receives current, i.e. in the so-called "current gap." In this gap, rotor 33 is driven by a so-called "reluctance torque."

This calculation phase A is important and should therefore not be interrupted by reset processes, since, for example, the timing points $t_{ON}$ and $t_{OFF}$ for the subsequent strand currents are being calculated.

After each calculation phase A, there is a calculation phase B during which, based upon the values calculated in calculation phase A, various routines or processes can be executed:

a) The time interval KZ from the end of calculation phase A until the next commutation instant is measured. This can be done, for example, by running through a program loop of predetermined duration and counting the number of loop runs in a commutation counter or register KZ.

b) The time interval PI is measured and, after its expiration, the strand current is turned on.

c) The time interval until instant $t_{OFF}$ is measured and then the strand current is turned off.

d) Optionally, a servo deviation can be measured, and factors for a RPM controller, e.g. a Proportional- or an Integral-factor, are correspondingly adjusted and each stored in a respective register, so that subsequently in the next calculation phase A, a new PI value can be calculated.

FIG. 4 illustrates that the commutations at timepoints 0° el., 360° el., etc. are triggered by the cyclical reset signal R, and that the commutation signal KOMM is tested by the program at timepoints 180° el 540° el., etc. to cause commutation at these latter points in time.

If the program should "hang" at, e.g. timepoint $t_F$ (graph c) due to external noise signals, the current $i_1$ would remain switched on past 180° el., as shown by the dashed curve, since, because the program isn't running, it can't react to the KOMM signal. Motor 30 would be braked by the current $i_1$ and would come to a standstill.

This is prevented by the fact that, at timepoint 360° el., the reset signal R restarts the program by, e.g. setting the instruction counter back to 0 and starting the run anew. In this manner, current $i_1$ is interrupted, and the program runs normally again.

Of course, in the normal case, the program doesn't "hang" at all, and in this case the running program is simply interrupted by a signal R during one of the subroutine runs of calculation phase B. The registers, e.g. for the proportional factor P or for the value KZ, remain at the previously-reached value, and these values are used subsequently in the following calculation phase A.

Thus, an error can only propagate from error time point $t_F$ until the next reset signal R, at which time normal motor operation and normal program execution resume. This reset signal R can obviously originate from a separate sensor or can be calculated from internal data of the motor. The solution described herein is particularly advantageous and reliable, and it achieves an automatic coupling of the signal courses and calculation routines by the system, i.e. the turning rotor 33.

FIG. 5 is a schematic flowchart of execution of a program which can form the basis for the motor run shown in FIG. 4.

As motor 30 is turned on, which corresponds to position A on the flowchart, a reset signal is on the input. RESET of microprocessor 40 since capacitor 58 (FIG. 3) is discharged upon turn-on, so that the input RESET is at voltage level L. Step S70 tests whether a Power-On reset is to be performed. Upon turn-on, this is indeed the case, since capacitor 66 (FIGS. 3 and 6) is also discharged upon turn-on, so that P=L, and step S72 performs a complete initialization. In subsequent step S73, switch 68 (FIG. 6) is closed, causing capacitor 66 to charge up.

The program then goes to step S74 and starts, on the basis of the values from step S72, a calculation phase A, e.g. the calculation of the value PI (FIG. 4, graph c). This occurs approximately in the rotational range 0° el ... 10° el. or 180° el ... 190° el. of the rotor, i.e. at a point in time after the reset signal R has been generated.

Upon conclusion of calculation phase A (step 74), the program proceeds to step S76, i.e. calculation phase B, which has been thoroughly explained with reference to FIG. 4. That one of currents $i_1$ and $i_2$ is turned on, which corresponds to the instantaneous value of commutation signal KOMM, i.e. if KOMM=L, $i_1$ is turned on, and if KOMM=H, $i_2$ is turned on.

Calculation phase B is part of a loop 78 and is thus run multiple times, i.e. each time that step S76 is run, a step S80 tests whether the KOMM signal value has changed. If not, the program returns to position C and again executes step S76.

Each loop run has a predetermined duration, e.g. 125 microseconds. The number of loop runs is counted in a counter KZ, and this provides the value KZ illustrated in graph c of FIG. 4. Value KZ is a measure of the time interval between two commutation events and is approximately inversely proportional to the RPM of the motor.

When one comes to a commutation point, i.e. the points in FIG. 4 labeled 0° el, 180° el, 360° el, etc., there are two possibilities:

a) At the positions 180° el., 540° el. etc., step S80 determines that the KOMM signal has changed from L to H, and the program goes back to position B. It then goes first, at step S74, again through calculation phase A, then again into loop 78, in which current $i_2$ is turned on, and runs through this loop multiple times (calculation phase B).

b) At the positions 0° el., 360° el., etc., the reset signal R arises at the RESET input of microprocessor 40, and this causes, in step S82, an interruption of calculation phase B at some arbitrary place in the midst of loop 78 execution, and a return to position A of the program. Due to the reset process, in step S83 switch 68 (FIG. 6) is opened, so that the charging of capacitor 66 is briefly interrupted.

According to embodiment b) of the process, i.e. the cyclical reset process caused by the system (the turning of rotor 33), the program goes again to step S70, where this time it is determined that there is to be no Power-On Reset, since capacitor 66 (FIGS. 3 & 6) is now charged and the statement P=H is true. Therefore, in step S84, a cyclical initialization is carried out, in which, above all, the commutation counter is reset to a predetermined value, e.g. the value 0, and the program is started anew. Depending upon requirements, particular registers can also be reset. This differs from case to case and is a matter of programmer's choice. For example, the target RPM value or the minimum RPM value (for ALARM) can be newly decoded.

After this cyclic initialization, in step S84, the program is again at position B, and the already-described run with calculation phase A (S74) and calculation phase B (loop 78) begins anew, with in this case current $i_1$ turned on.

As FIG. 4 makes apparent, one can do a cyclical reset at 0° el.; at 180° el., one can trigger commutation directly by checking the signal KOMM (via program step S80); subsequently at 360° el. one can again do a cyclical reset, etc., with the cyclical reset processes in this example simultaneously accomplishing commutation: the commutation from $i_2$ to $i_1$ (at 0° el., 360° el. etc.) occurs by means of a cyclical reset, and the switchover from $i_1$ to $i_2$, e.g. at 180° el. occurs by program polling or testing of the signal KOMM in step S80.

Naturally, it could suffice to execute, per rotor rotation, a single reset process triggered by the turning of the rotor, or only upon every 5th rotation, but since the illustrated version is very practical and easy to implement, it will in general be advantageous to implement every second commutation in the form of a cyclical reset process, since this way any error in the program run will be rapidly corrected and replaced by a normal program execution. This results in a very reliable and dynamically satisfactory running of a motor system structured according to the invention.

The improved dynamics of the motor result from the fact that the reset signal R causes an immediate exit from program loop 78. It thus replaces the test in step S80, as to whether the commutation was changed.

While the test of step S80 usually occurs with some time delay, because the entire loop 78 may have to be run through before the test, and this test can thus have a substantial time separation from the commutation instant, the time of the reset signal R is precisely defined, i.e. this signal achieves a more time-precise commutation and therefore a better dynamic running of the motor, which manifests itself in, for example, a quieter running sound. It can therefore be advantageous to generate a reset signal R also at rotor positions 180° el. 540° el., etc. and to carry out cyclical reset steps even there.

FIGS. 7 & 8 illustrate a detailed embodiment of the inventive method, which also relates to the circuit shown in FIGS. 3 & 6.

FIG. 7, graph a, shows the signal KOMM at the output of sensor 35, while graph b shows the reset signal R. These signals are consistent with those shown in FIG. 4, graphs a,b.

FIG. 7, graph c, shows the courses of currents $i_1$ and $i_2$ in the respective strands 31, 32 of motor 30. These currents have somewhat of a time overlap, since, upon commutation, here current in one of the strands is turned off, and practically simultaneously, current in the other strand is turned on.

The commutation counter KZ (in microprocessor 40) measures here the quantity KZ between two successive reset signals R, as shown in FIG. 7, graph c. This corresponds to a rotation of the rotor through 360° el.

As FIG. 8 shows, here, upon turn-on of motor 30, the reset procedure at S100 is carried out. In step S102, a test is made as to whether P=H (compare the explanations with respect to FIG. 6). Upon turn-on of motor 30, P=L, since capacitor 66 is discharged and therefore the program goes to step S104 and carries out a Power-On Reset, which includes setting a counter AVZ to the value 1000. This achieves an alarm delay upon turn-on of the motor, i.e. within a predetermined time span from the turn-on of motor 30, the signal ALARM cannot be generated. Therefore, the signal ALARM is also set to L. Further, the commutation counter KZ is set to 0.

Subsequently, in step S106, the switch 68 is closed, so that capacitor 66 (FIGS. 3 and 6) becomes charged up. Thereafter, the program goes to step S108, where the commutation counter KZ is incremented by 1 and the counter AVZ is decremented by 1 (AVZ can only be decremented as far as the value 0).

In step S110, the value of the signal KOMM is tested. At position 0° el. (FIG. 7) KOMM=L, and therefore in step S112 the value A1=H is set, i.e. transistor 37 (FIG. 3) is turned on and the value A2 is set to L, i.e. transistor 38 remains turned off.

In step S114, a test is made as to whether AVZ=0. If not, the program goes back to position E and the steps S108, S110, S112 and S114 are carried out multiple times. Each time, the commutation counter KZ is incremented and the counter AVZ is decremented. Since the loop runs are of identical length and of a duration of, for example, 125 microseconds, the commutation counter KZ measures the time interval between two reset signals R.

If, at rotational position 180° el., the signal KOMM changes from L to H, the program goes to step S116, i.e. transistor 37 is turned off and transistor 38 is turned on, so that the current $i_1$ is interrupted and the current $i_2$ begins to flow.

If, after a number of rotations of rotor 33, the counter state AVZ=0 has been reached, the program goes to step S118 and tests whether the state of counter KZ has reached a high value, e.g. 300. This would correspond to an impermissibly low number of rotations of the motor. If NO, the motor goes back to position E. If YES, in step S120 the signal ALARM (FIG. 3) is set and may also be stored.

If the rotor 33 (FIG. 3) now reaches rotational position 360° el., a reset signal R is generated and this interrupts the program at some point between position E and the lower end of FIG. 8, as is indicated in step S124. In this connection, in step S126, as a part of the reset process, the switch 68 is opened, so that subsequently, in step S102, a poll of Port P (via the connection 69 of FIG. 6) is possible.

In this case, the capacitor 66 is charged and therefore P=H is true, i.e. the program goes in this case to step S128 and carries out a cyclical reset, which primarily involves setting KZ=0 and a possibly decoding again the minimum permitted RPM.

Subsequently, the previously-described program is executed anew.

During running of motor 30, the step S128 is repeatedly executed, while step S104 is executed once upon start. This permits, by the simplest possible means, a differentiation between startup, on the one hand, and continuous running of the motor, on the other hand. In the course of cyclical reset procedures of step S128, the other register contents are preserved, e.g. the register value for AVZ and the register value for ALARM, i.e. these are adjusted to specific values only upon turn-on of motor 30.

In this manner, one makes motor 30 very secure against noise voltages which may occur during operation. In accordance with the invention, this is achieved very simply and without significant additional cost.

Naturally, within the scope of the present invention, many variation and modifications are possible. In particular, features of one embodiment of the invention can be combined with the features of another embodiment. Therefore, the scope of the invention is not limited to the particular embodiments described above, but rather is to be defined by the appended claims.

What is claimed is:

1. An electric motor system, comprising
   an electronically commutated motor (30) having a rotor (14, 33) and stator winding means (31, 32);
   a motor-control microprocessor (18,40) which has a reset input (24) to which, after motor startup, a power-on reset signal can be applied;
   means (35) for generating rotor-position-dependent reset signals (R), during running of said motor, at times which are a function of rotational position of said rotor (14; 33), said reset signals being applied to said reset input;
   a memory element (66), whose memory state can be changed by a reset process triggered by a power-on reset signal, said microprocessor checking said state in order to discriminate between a power-on reset signal and a rotor-position-dependent reset signal resulting from rotation of said rotor, and
   means, in said microprocessor, responsive to application of said rotor-position-dependent reset signal (R) to said reset input (24), for resetting said microprocessor to certain predefined initial states.

2. An electric motor system according to claim 1, wherein said reset signal (R) is derived from a signal (KOMM) representing rotational position of said rotor (14, 33).

3. An electric motor system according to claim 2, further comprising a differentiating element (26; 56) which differentiates said rotational position signal (KOMM) and thereby derives said rotor-position-dependent reset signal (R).

4. An electric motor system according to claim 1, wherein said microprocessor responds to said Power-On Reset signal by performing a complete initialization (S72), and to said rotor-position-dependent reset signal (R) by performing a different kind of initialization (S84).

5. An electric motor system according to claim 1, wherein said state of said memory element (66) is refreshed (S126) upon rotation of said motor (30), and wherein, in a pause between refreshing steps (S126), discrimination between said Power-On Reset signals and said rotor-position-dependent reset signals (R) is performed.

6. An electric motor system according to claim 5, wherein said memory element (66) is a capacitor, and has an associated discharging element (67).

7. An electric motor system according to claim 6, wherein said discharging element (67) is a resistor connected to ground.

8. An electric motor system according to claim 6, wherein said capacitor (66) is charged up, under control of said microprocessor (40), during specific calculation steps of the system (S106–S126) and such charging is interrupted, at least during discrimination among kinds of reset signals, in order to perform a check (69) of the charge state of said capacitor (66).

9. An electric motor system according to claim 1, wherein said rotor-position-dependent reset signal (R) effects an interruption (S82) of a currently-running program in said microprocessor.

10. An electric motor system according to claim 1, wherein said rotor-position-dependent reset signal (R) coincides, at least approximately, in time with a commutation instant of said motor (0° el., 360° el.).

11. An electric motor system according to claim 1, further comprising
    a capacitor (58) and a charging circuit (48, 59) therefor, wherein said capacitor (58) is charged up during turn-on of said motor, and a low charge voltage on said capacitor triggers generation of a Power-On Reset signal.

12. A method of operating an electronically-commutated motor having a rotor (14; 33), and a motor-control microprocessor (18) having a reset input,
    comprising the steps of:
    using a microprocessor to discriminate among a power-on reset signal applied to said reset input and a rotor-position-dependent reset signal (R) applied to said reset input, by
    using said power-on reset signal to change a memory state of a memory element (66) associated with said motor, in such a way that this changed state permits discriminating subsequent reset signals as rotor-position-dependent reset signals (R);
    sampling the memory state of said memory element (66) using said microprocessor (18) upon occurrence of each reset signal (S70; S102); and
    depending upon said memory state, discriminating a reset signal received at said reset input of said microprocessor (18) as either a power-on reset signal or a rotor-position-dependent reset signal and
    depending upon results of said discriminating step, carrying out, in said microprocessor, one of a plurality of different processes (S72, S84; S104, S128).

13. The method of claim 12, further comprising after each sampling of the state of said memory element (66), refreshing (S73; S106) said memory element.

14. The method of claim 12, further comprising
    deriving said rotor-position-dependent reset signals (R) from a signal (KOMM) used in commutation of said motor.

15. The method of claim 14, further comprising deriving said rotor-position-dependent reset signals by differentiating said signal (KOMM) used in commutation of said motor.

16. The method of claim 14, further comprising triggering a new commutation cycle of said motor, each time that a reset signal has been discriminated as said rotor-position-dependent reset signal.

* * * * *